US009446632B2

(12) United States Patent
Maeyama et al.

(10) Patent No.: US 9,446,632 B2
(45) Date of Patent: Sep. 20, 2016

(54) INNER SAFETY WHEEL, TIRE WITH INNER SAFETY WHEEL, AND VEHICLE EQUIPPED WITH TIRES WITH INNER SAFETY WHEEL

(75) Inventors: Hiroyuki Maeyama, Tokyo (JP); Hiromichi Yamamoto, Tokyo (JP); Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 137 days.

(21) Appl. No.: 13/812,970

(22) PCT Filed: Jul. 15, 2011

(86) PCT No.: PCT/JP2011/066273
§ 371 (c)(1),
(2), (4) Date: Jan. 29, 2013

(87) PCT Pub. No.: WO2012/086247
PCT Pub. Date: Jun. 28, 2012

(65) Prior Publication Data
US 2013/0126065 A1    May 23, 2013

(30) Foreign Application Priority Data
Dec. 21, 2010    (JP) ................. 2010-284852

(51) Int. Cl.
*B60C 17/00*    (2006.01)
*B60C 17/04*    (2006.01)
*B60B 21/12*    (2006.01)

(52) U.S. Cl.
CPC .............. *B60C 17/04* (2013.01); *B60B 21/12* (2013.01); *B60C 17/041* (2013.04); *B60B 2900/3312* (2013.01); *B60B 2900/731* (2013.01); *B60Y 2200/11* (2013.01); *B60Y 2200/14* (2013.01)

(58) Field of Classification Search
CPC ..... B60C 17/00; B60C 17/04; B60C 17/041; B60C 17/042; B60C 19/00
See application file for complete search history.

(56) References Cited

U.S. PATENT DOCUMENTS 7,503,362 B2 * 3/2009 Chandler et al. ............. 152/516
2005/0217776 A1 10/2005 Chen

FOREIGN PATENT DOCUMENTS

| CN | 1655958 | 8/2005 |
|----|---------|--------|
| GB | 2 032 856 | 5/1980 |
| JP | 58-13366 | 3/1983 |

(Continued)

OTHER PUBLICATIONS

International Search Report mailed Oct. 4, 2011 in International (PCT) Application No. PCT/JP2011/066273 with English translation.

(Continued)

*Primary Examiner* — Justin Fischer
(74) *Attorney, Agent, or Firm* — Wenderoth, Lind & Ponack, L.L.P.

(57) ABSTRACT

Provided is a core (10A), in which split pieces (10P) adjacent to each other in a circumferential direction are coupled by a coupling pin (11), an axial direction of which is disposed in a width direction of the split pieces (10P), at a radial inner circumferential side thereof, and split surfaces (10a, 10b) formed by both of the split pieces (10P, 10P) include a first load receiving surface (10c) and a second load receiving surface (10d) having a predetermined angle with respect to a radial direction at a radial outer circumferential side from the coupling pin (11).

20 Claims, 11 Drawing Sheets

(56) References Cited

FOREIGN PATENT DOCUMENTS

| | | |
|---|---|---|
| JP | 63-312209 | 12/1988 |
| JP | 3-56201 | 8/1991 |
| JP | 3-107204 | 11/1991 |
| JP | 4-9681 | 2/1992 |
| JP | 4-9682 | 2/1992 |
| JP | 4-11842 | 3/1992 |
| JP | 05-065004 | 3/1993 |
| JP | 10-211807 | 8/1998 |
| JP | 10-278503 | 10/1998 |
| JP | 2002-59721 * | 2/2002 |
| JP | 3556004 | 8/2004 |
| JP | 2005-126028 | 5/2005 |
| JP | 2006-51914 | 2/2006 |
| JP | 2006-306334 | 11/2006 |
| JP | 2006-315643 | 11/2006 |

OTHER PUBLICATIONS

Written Opinion of the International Searching Authority mailed Oct. 4, 2011 in International (PCT) Application No. PCT/JP2011/066273 with English translation.

Chinese Office Action issued Jul. 25, 2014 in corresponding Chinese Patent Application No. 201180036479.9 with partial English translation.

* cited by examiner

INNER SAFETY WHEEL, TIRE WITH INNER SAFETY WHEEL, AND VEHICLE EQUIPPED WITH TIRES WITH INNER SAFETY WHEEL

TECHNICAL FIELD

The present invention relates to an inner safety wheel which is used in, for instance, vehicles of a new traffic system and which is split into a plurality of pieces at regular intervals in a circumferential direction, a tire with inner safety wheel, and a vehicle equipped with the tires.

This application claims priority to and the benefits of Japanese Patent Application No. 2010-284852 filed on Dec. 21, 2010, the disclosure of which is incorporated herein by reference.

BACKGROUND ART

In the related art, vehicles have been known in which, when an internal pressure of a tubeless pneumatic tire is reduced in a new traffic system such as a monorail or a subway, a core-type auxiliary wheeled tire supporting the tubeless pneumatic tire from the inside is employed. As an example of the core of this pneumatic tire, a joint of the core split into three in a circumferential direction is adopted as a normal direction (a radial direction adopting an axle of the tire as a central axis), and each matching surface is fastened by a plurality of bolts and nuts (e.g., see Patent Document 1).

FIG. 15 shows an example of the core disclosed in Patent Document 1. The core 10 shown in FIG. 15 is provided with flange parts 10e, each of which has a bolt hole in a split surface of each of split pieces 10P obtained by splitting the core into three in a circumferential direction, and is configured so that the flange parts 10e of the adjacent split pieces 10P are coupled by a bolt and nut 10f. Thereby, the core 10 is formed in a ring shape.

Incidentally, in the core 10 as in FIG. 15, at normal times at which the tire 1 is not punctured, the core 10 is free of load in a state in which it is set in the tire, and there is a gap between a tire tread part and the core 10. When the tire 1 is punctured or when an internal pressure is reduced by air leakage, the tire becomes flat. In this case, the core 10 comes in contact with an inner surface of the tire tread part, and receives the load which the tire 1 covers. As a result, the core 10 rotates together with a wheel, restricts a lowering amount (or a sinking amount) caused by a puncture, and allows a vehicle to travel while suppressing inclination of the vehicle.

RELATED ART DOCUMENTS

Patent Document

[Patent Document 1] Japanese Patent Application, First Publication No. H10-211807

SUMMARY OF THE INVENTION

Problems to be Solved by the Invention

However, the wheel for a vehicle which has the core in the related art has problems as described below.

In Patent Document 1, when the three split cores are coupled in one body, a bead part of the tire is kept open. In this state, the cores are assembled in the tire, and the bolts and nuts are inserted to perform fastening work on the three split cores. However, since the tire itself is a hard rubber material, there is a problem in that it is difficult to widely spread the bead part, which provides poor workability in the tire. For this reason, there is a need to increase workability when the core is assembled and disassembled.

Further, when the tire is exchanged, there is a need to disassemble the core. In this case, since the core split surfaces are located in the normal direction, when a joint part thereof passes through a ground while traveling with a puncture, a shear force is applied between both of the split surfaces, and a distortion force is applied to the coupling bolt whose axis is disposed in a direction perpendicular to the split surface. Here, since a rubber sheet of an elastic body is interposed between the wheel and the coupling bolt, the coupling bolt is subjected to slight deformation around the joint part, and thus does not easily fall out. For this reason, by forcibly unfastening the coupling bolt, the bolt hole of the core is widened and is drilled again. Then, it is necessary to be repaired, such as addition of a bush.

The present invention has been made keeping in mind the above problems, and is intended to provide an inner safety wheel, which suppresses the deformation of a joint bolt with respect to a load of a shear direction in a joint part between split cores, thereby increasing workability of assembly and disassembly of the split cores and promoting the improvement of work efficiency, a tire with inner safety wheel, and a vehicle equipped with the tires with the core.

Means for Solving the Problems

To accomplish the object, according to a first aspect of the present invention, there is provided an inner safety wheel which is split into a plurality of pieces at regular intervals in a circumferential direction thereof, in which the split pieces adjacent to each other in the circumferential direction are coupled at a radial inner circumferential side thereof by a connecting shaft member, an axial direction of which is disposed in a width direction of the split pieces.

In the first aspect, when a load is applied to the core in the tire while traveling with a puncture, split surfaces of the core are located in the normal direction. For this reason, when a joint part between the split surfaces of the core which are adjacent in the circumferential direction goes through a ground side, a distortion force (shear force) is applied between both of the split pieces thereof. Here, at the radial inner circumferential side, an axial direction of the connecting shaft member coupling the split pieces to each other is disposed in a width direction of the split pieces. As such, the axial direction of the connecting shaft member is parallel to the shear direction. For this reason, in comparison with the structure in the related art in which the axial direction of, for instance, the coupling bolt is the direction orthogonal to the shear direction, the deformation of the connecting shaft member caused by a load of the shear direction can be suppressed. Therefore, the disassembly work of the core which occurs with the deformation of the connecting shaft member is not obstructed, and thus the improvement of work efficiency can be promoted.

Further, since the connecting shaft member is disposed at the radial inner circumferential side, attaching or detaching work of the connecting shaft member installed on the split surfaces of the split pieces is carried out in the vicinity of an opening obtained by widening a bead part of the tire. As such, the workability of assembling and disassembling the split core can be increased. For this reason, work time can be reduced, and the reduction in the cost required to exchange the tire can be promoted.

Further, split surfaces formed by the split pieces may have intersecting surfaces, which have a predetermined angle with respect to a radial direction, at a radial outer circumferential side from the connecting shaft member.

Since the intersecting surfaces are located at the radial outer circumferential side from the connecting shaft member and become load receiving surfaces that cover the shear directional load applied between the split pieces, the shear directional load is not directly applied to the connecting shaft member. Therefore, the deformation of the connecting shaft member can be more reliably suppressed. Since the occurrence of the deformation of the connecting shaft member is suppressed in this way, the disassembly work of the core which occurs with the deformation of the connecting shaft member can be efficiently carried out.

Further, the connecting shaft member may be a pin member inserted through the split pieces adjacent to each other on the same axis.

In this case, the core is assembled simply by inserting the pin members through the respective neighboring split pieces at the radial inner circumferential side of the core. Thus, since fastening work using a bolt and nut is not required, the work efficiency when the split core is assembled and disassembled can be increased. Further, since the bolt and nut are not used, torque management using a torque wrench is not required either. Therefore, a drawback such as forgetting to fasten the nut can be removed. In addition, a problem such as the bolt and nut becoming loosened when the tire is punctured and thus the vehicle is inclined without supporting the load with the core can be prevented.

Also, the split surfaces of the split pieces may have concave grooves extending in the width direction at the radial outer circumferential side from the connecting shaft member, and in a state in which the split pieces adjacent to each other are engaged by the split surfaces, a load receiving pin may be inserted into a communication part formed by both facing concave grooves on the engaged surfaces.

When the tire is punctured and the vehicle travels with the load supported by the core, although the shear directional load is applied to the split surfaces of the split pieces, this load is covered by the load receiving pin located at the radial outer circumferential side of the core. For this reason, the shear directional load is not directly applied to the connecting shaft member that is installed at the radial inner circumferential side from the load receiving pin, and deformation of the connecting shaft member can be more reliably suppressed. Since the deformation of the connecting shaft member is suppressed in this way, the disassembly work of the core which occurs with the deformation of the connecting shaft member can be efficiently carried out.

Further, the split surfaces of the split pieces may have convex insertion parts, each of which has an insertion hole through which the connecting shaft member is inserted, and the split pieces adjacent to each other may be configured so that both of the convex insertion parts are alternately engaged by causing the insertion holes to be disposed coaxially.

In this case, when the tire is punctured and the vehicle travels with the load supported by the core, since the first convex insertion parts of one split piece and the second convex insertion parts of the other split piece are alternately supported, the load applied to the connecting shaft member in the normal direction can be distributed.

Further, the connecting shaft member may be provided with first stopper members at opposite ends thereof which restrain axial movement of the connecting shaft member.

Thereby, since the axial movement of the connecting shaft member is restrained, the connecting shaft member neither falls out nor becomes loose at the joint part between the split pieces of the core at the joint part between the split cores, and the joined state between the split pieces becomes reliable.

Also, the load receiving pin may be provided with second stopper members at opposite ends thereof which restrain axial movement of the load receiving pin.

In this case, since the axial movement of the load receiving pin is restrained, this provides an advantage in that the load receiving pin neither falls out nor becomes loose at the joint part between the split pieces of the core.

Further, the split surfaces formed by the split pieces may have an engaging convex part, which protrudes from one split piece, and an engaging concave part, which is fitted with the engaging convex part in the other split piece, provided at the radial outer circumferential side from the connecting shaft member.

In the split pieces, the load receiving surfaces having a predetermined angle with respect to the radial direction are formed by engagement of the engaging convex part and the engaging concave part. The load receiving surfaces cover the shear directional load applied between the split pieces. For this reason, the shear directional load is not directly applied to the connecting shaft member, and the deformation of the connecting shaft member can be more reliably suppressed. Since the deformation of the connecting shaft member is suppressed in this way, the disassembly work of the core which occurs with the deformation of the connecting shaft member can be efficiently carried out.

Further, according to a second aspect of the present invention, there is provided a tire with inner safety wheel in which the aforementioned inner safety wheel is mounted.

Further, according to a third aspect of the present invention, there is provided a vehicle having a plurality of traveling wheels, each of which has the aforementioned tire with inner safety wheel.

In the second and third aspects of the present invention, since the inner safety wheel of the first aspect of the present invention is provided, the tire with inner safety wheel or the vehicle capable of suppressing the deformation of the connecting shaft member caused by the shear directional load can be provided.

Effects of the Invention

According to the inner safety wheel, the tire with inner safety wheel, and the vehicle equipped with the tires with inner safety wheel of the present invention, the deformation of the connecting shaft member against the shear directional load is suppressed at the joint part between the split cores. Thereby, the workability of assembling and disassembling the split cores can be increased, and the improvement of work efficiency can be promoted.

MODES FOR CARRYING OUT THE INVENTION

Hereinafter, an inner safety wheel, a tire with inner safety wheel, and a vehicle according to embodiments of the present invention will be described with reference to the accompanying drawings.

(First Embodiment)

Figure 1:
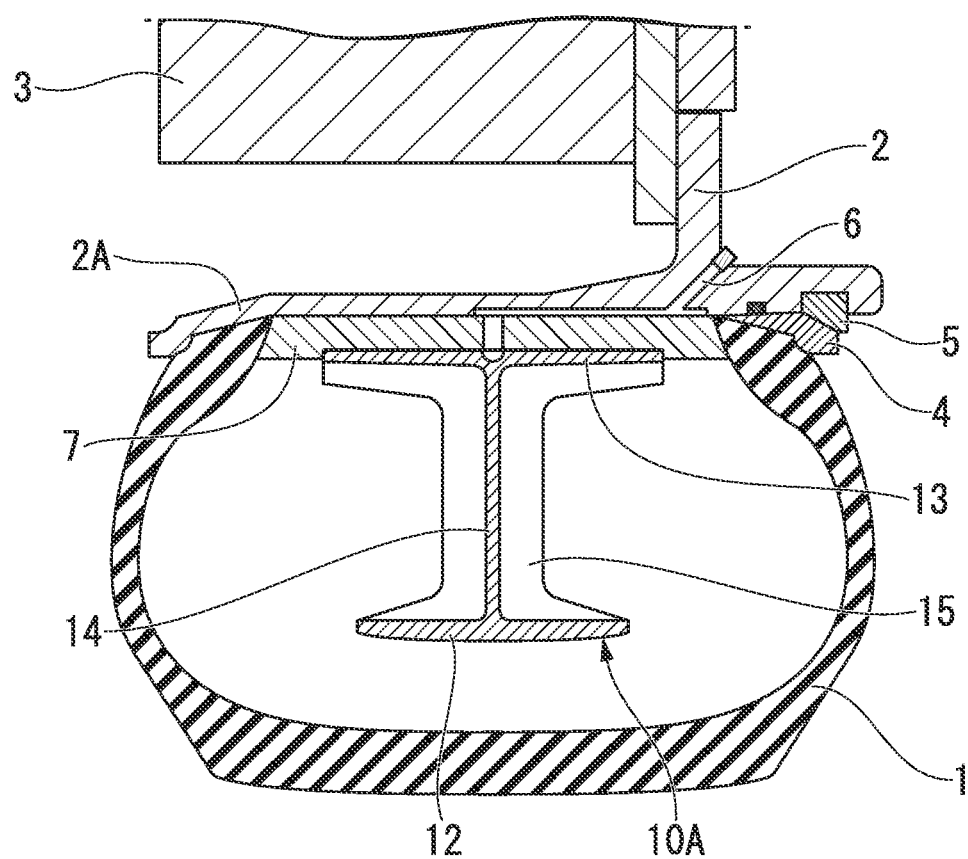
FIG. 1 is a partial cross-sectional view showing an outline of a wheel according to a first embodiment of the present invention.

As shown in FIG. 1, a core 10A according to a first embodiment of the present invention is incorporated in an interior of a pneumatic tire (hereinafter, simply referred to as a tire 1), and supports the tire 1 from an inner side of the tire 1 when an internal pressure of the tire 1 is reduced.

Here, among the reference numerals of FIG. 1, reference numeral 2 indicates a wheel, reference numeral 3 indicates an axle hub, reference numeral 4 indicates a side ring, reference numeral 5 indicates a lock ring, reference numeral 6 indicates a valve, and reference numeral 7 indicates a rubber sheet installed between the core 10A and a rim flange 2A of the wheel 2.

Figure 2:
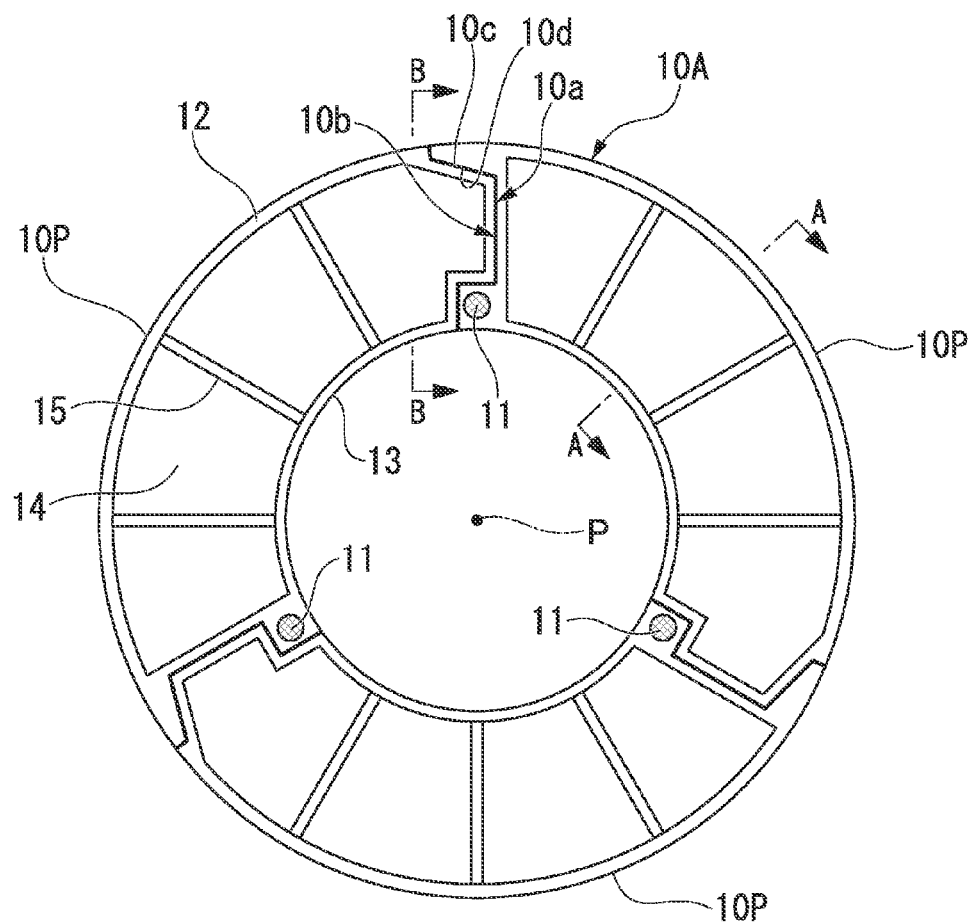
FIG. 2 is a side view showing a core according to the first embodiment of the present invention.
Figure 3:
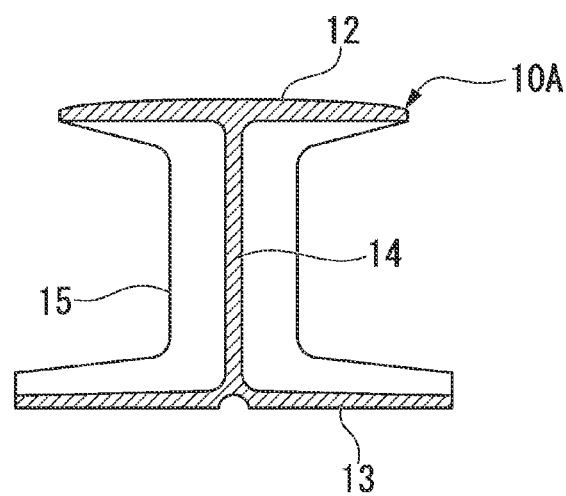
FIG. 3 is a cross-sectional view taken along line A-A shown in FIG. 2.

Thus, in FIGS. 1 to 3, the left side in the drawings is an inner side in a width direction of a vehicle, and the right side in the drawings is an outer side in the width direction of the vehicle.

Further, in the core 10A, a direction orthogonal to an axle P of the axle hub 3 is referred to as a diametrical direction or a radial direction, a direction revolving about the axle P is referred to as a circumferential direction, and a direction parallel to the axle P is referred to as a width direction X.

The core 10A includes a crown part 12 supporting the tire 1 from the inner side of the tire 1, a base part 13 forming a radial innermost side of the core 10, a support part 14 connected to the base part 13 and the crown part 12, and a reinforcement rib 15 installed at intervals in a circumferential direction thereof and reinforcing the support part 14. Further, the core 10A has approximately an H shape when viewed in the cross section.

Figure 4:
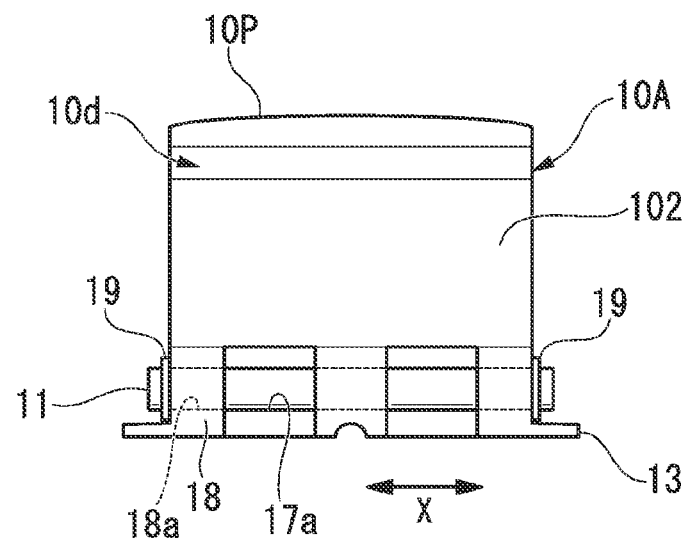
FIG. 4 is a cross-sectional view taken along line B-B shown in FIG. 2.

As shown in FIGS. 2 to 4, the core 10A is split into a plurality of pieces (here, three) at regular intervals in a circumferential direction thereof. The split core 10A is used as a split piece 10P. The split pieces 10P and 10P adjacent to each other in a circumferential direction are coupled by a coupling pin (connecting shaft member) 11, an axial direction of which is directed in the width direction X of the split piece 10P, on a radial inner circumferential side thereof. That is, the split piece 10P has a first split surface 10a at one circumferential end thereof and a second split surface 10b at the other circumferential end thereof.

Then, the first split surface 10a of one split piece 10P and the second split surface 10b of the other split piece 10P, both of which are closely disposed in the circumferential direction, are joined, and thereby the core 10A of a ring shape is formed.

Figure 5:
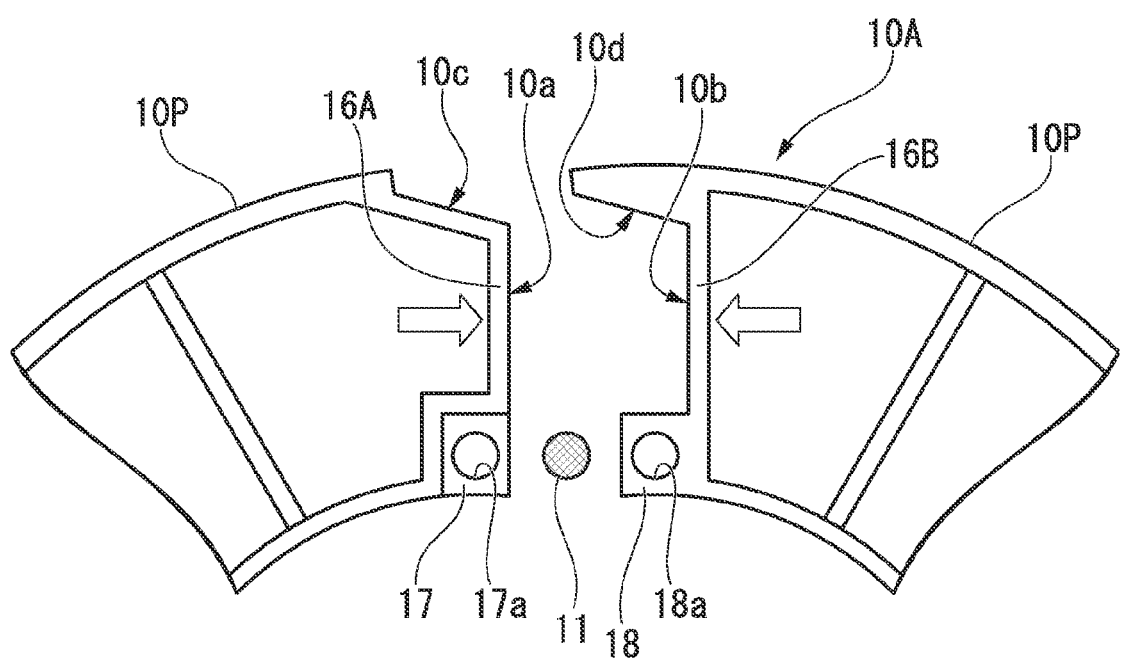
FIG. 5 is a side view for describing a first split surface and a second split surface before adjacent split pieces are joined in the first embodiment of the present invention.

As shown in FIG. 5, the first split surface 10a is provided with a joint flange 16A, and a plurality of (here, two) first convex insertion parts 17, each of which has an insertion hole 17a through which the coupling pin 11 is inserted, on a radial inner side thereof in a width direction thereof. Moreover, the split piece 10P is formed with a first load receiving surface (intersecting surface) 10c on a radial outer side thereof which is directed toward a circumferential outer side of the split piece 10P.

The second split surface 10b is provided with a joint flange 16B, and a plurality of (here, three) second convex insertion parts 18, each of which has an insertion hole 18a through which the coupling pin 11 is inserted, on a radial inner side thereof in a width direction thereof. Moreover, the split piece 10P is formed with a second load receiving surface (intersecting surface) 10d on the radial outer side thereof which is directed toward a circumferential inner side of the split piece 10P. The first load receiving surface 10c and the second load receiving surface 10d are each formed as an inclined surface that is inclined at a predetermined angle in a radial direction, and both surfaces 10c and 10d come in surface contact with each other.

The second convex insertion parts 18 are alternately engaged (meshed) with the first convex insertion parts 17 in a width direction thereof. That is, in the state in which the first and second convex insertion parts 17 and 18 are meshed, the insertion holes 17a and 18a thereof are coaxially arranged, and the coupling pin 11 is inserted through the insertion holes 17a and 18a.

Then, as shown in FIG. 4, the coupling pin 11 inserted into the insertion holes 17a and 18a is provided with C-shaped snap rings (first stopper members) 19 at opposite ends thereof which restrain axial movement of the coupling pin 11.

Next, an operation of the core 10A configured as described above will be described based on the drawings.

Figure 6:
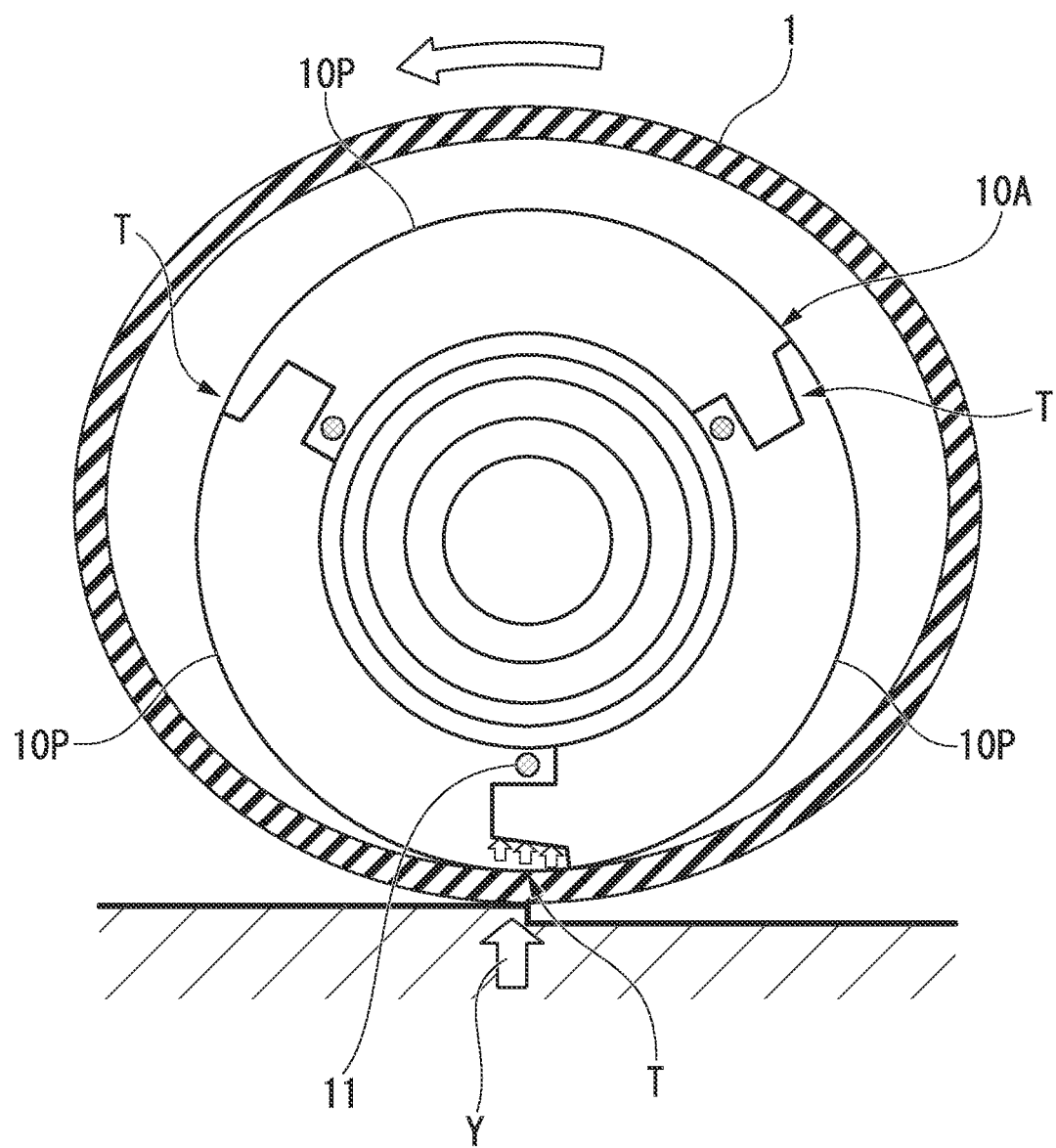
FIG. 6 is a side view for describing an operation of the core shown in FIG. 1.

As shown in FIG. 6, when a load is applied to the core 10A in the tire 1 while traveling with a puncture, the first and second split surfaces 10a and 10b of the core 10A are located in the normal direction Y. For this reason, when a joint part T between the split pieces 10P and 10P of the core 10A which are adjacent in the circumferential direction goes through a ground, a distortion force (shear force) is applied between both of the split pieces 10P and 10P thereof. Here, at the radial inner circumferential side, an axial direction of the coupling pin 11 coupling the split pieces 10P and 10P to each other is disposed in a width direction of the split piece 10P. As such, the axial direction of the coupling pin 11 is parallel to the shear direction.

For this reason, in comparison with the structure in the related art in which the axial direction of, for instance, the coupling bolt is the direction orthogonal to the shear direction, a load of the shear direction is not directly applied to the coupling pin 11, so that the deformation of the coupling pin 11 can be suppressed. Therefore, the disassembly work of the core 10A which occurs with the deformation of the coupling pin 11 is not obstructed, and thus the improvement of work efficiency can be achieved.

Further, since the coupling pin 11 is disposed at the radial inner circumferential side, attaching or detaching work of the coupling pin 11 installed on the first and second split surfaces 10a and 10b of the split pieces 10P and 10P is carried out around an opening obtained by widening a bead part of the tire 1. As such, the workability of assembling and disassembling the split core 10A can be increased. For this reason, work time can be reduced, and the reduction in the cost required to exchange the tire can be achieved.

Further, the first load receiving surface 10c is located at the radial outer circumferential side from the coupling pin 11, and becomes a load receiving surface that is subjected to a shear directional load applied between the split pieces 10P and 10P. For this reason, the shear directional load is not directly applied to the coupling pin 11, and the deformation of the coupling pin 11 can be more reliably suppressed. Since the deformation of the coupling pin 11 is suppressed in this way, the disassembly work of the core 10A which occurs with the deformation of the coupling pin 11 can be efficiently carried out.

Furthermore, the core 10A is assembled simply by inserting the pin members through the respective neighboring split pieces 10P at the radial inner circumferential side. For this reason, fastening work like a bolt and nut is not required. As such, the work efficiency when the split pieces 10P are assembled and disassembled can be increased. Further, since the bolt and nut are not used, torque management using a torque wrench is not required either, and a drawback such as forgetting to fasten the nut can be removed. Moreover, such a problem as the bolt and nut becoming loosened when the tire is punctured and thus the vehicle is inclined without supporting the load with the core can be prevented.

Further, when the tire 1 is punctured and the vehicle travels with the load supported by the core 10A, since the first convex insertion parts 17 of one split piece 10P and the second convex insertion parts 18 of the other split piece 10P are alternately supported, the load applied to the coupling pin 11 in the normal direction Y can be distributed.

Also, since the coupling pin 11 is restrained from being displaced in the axial direction by the C-shaped snap rings 19, the coupling pin 11 neither falls out nor becomes loose with respect to the split piece 10P of the core 10A, and the joined state between the split pieces 10P becomes reliable.

In the inner safety wheel, the tire with inner safety wheel, and the vehicle equipped with the tires with the core according to the aforementioned first embodiment of the present invention, the workability of assembly and disassembly of the split cores is increased, and the work efficiency is improved. Moreover, the deformation of the coupling pin 11 with respect to the shear force occurring at the joint part between the split cores (split pieces 10P) can be suppressed.

Next, another embodiment based on the inner safety wheel, the tire with inner safety wheel, and the vehicle of the present invention will be described based on the accompanying drawings. However, the same reference numerals are used for members or parts the same as or similar to those of the first embodiment described above, a description of which will be omitted, and a configuration different from that of the first embodiment will be described.

(Second Embodiment)

Figure 7:
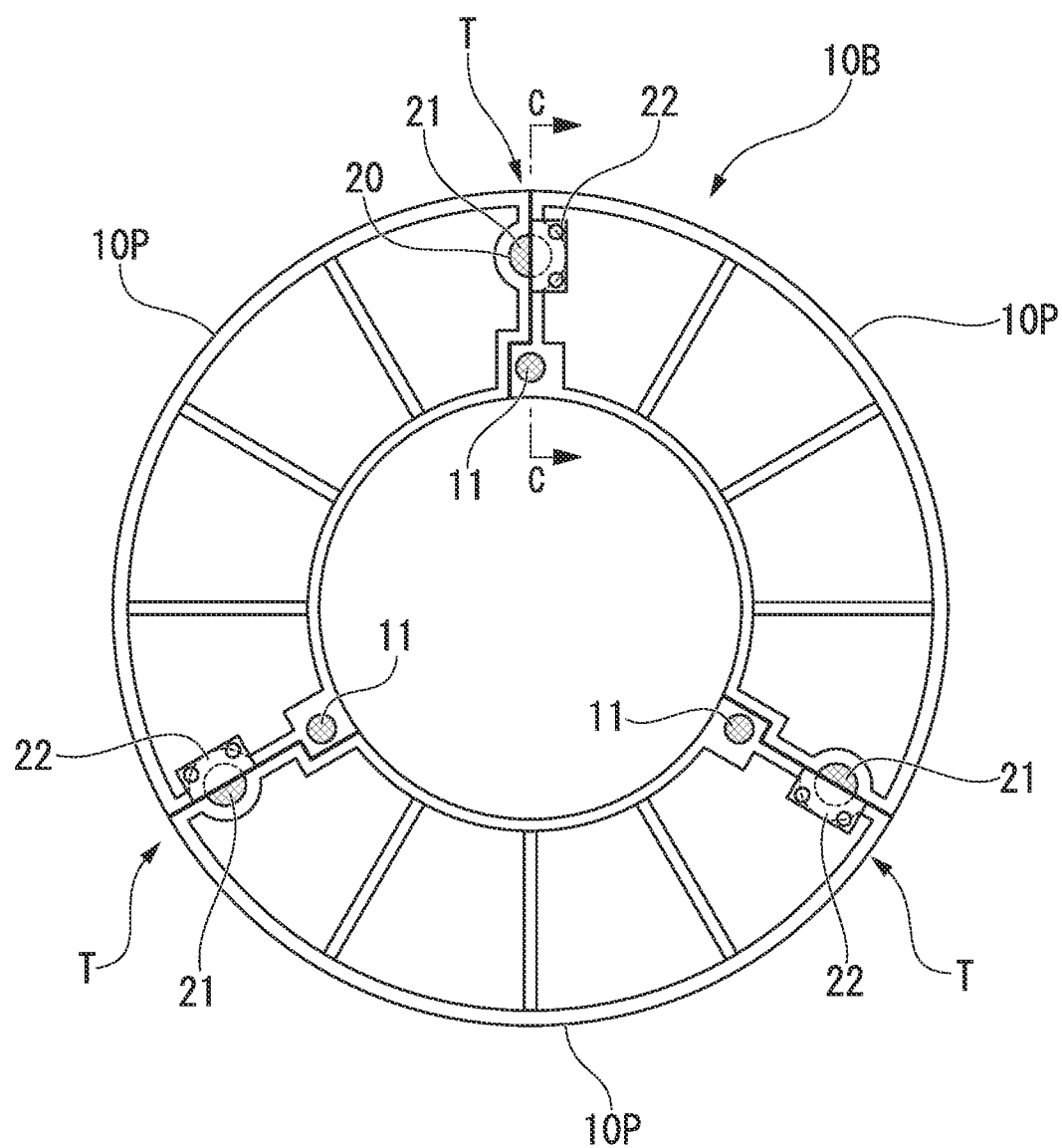
FIG. 7 is a side view showing a core according to a second embodiment of the present invention.
Figure 8:
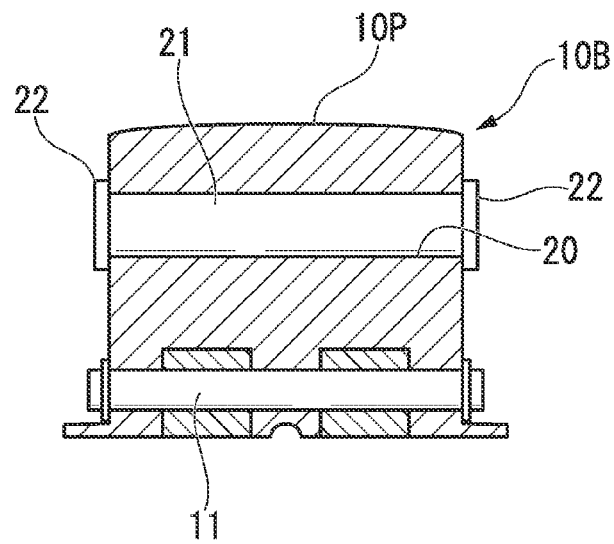
FIG. 8 is a cross-sectional view taken along line C-C shown in FIG. 7.
Figure 9:
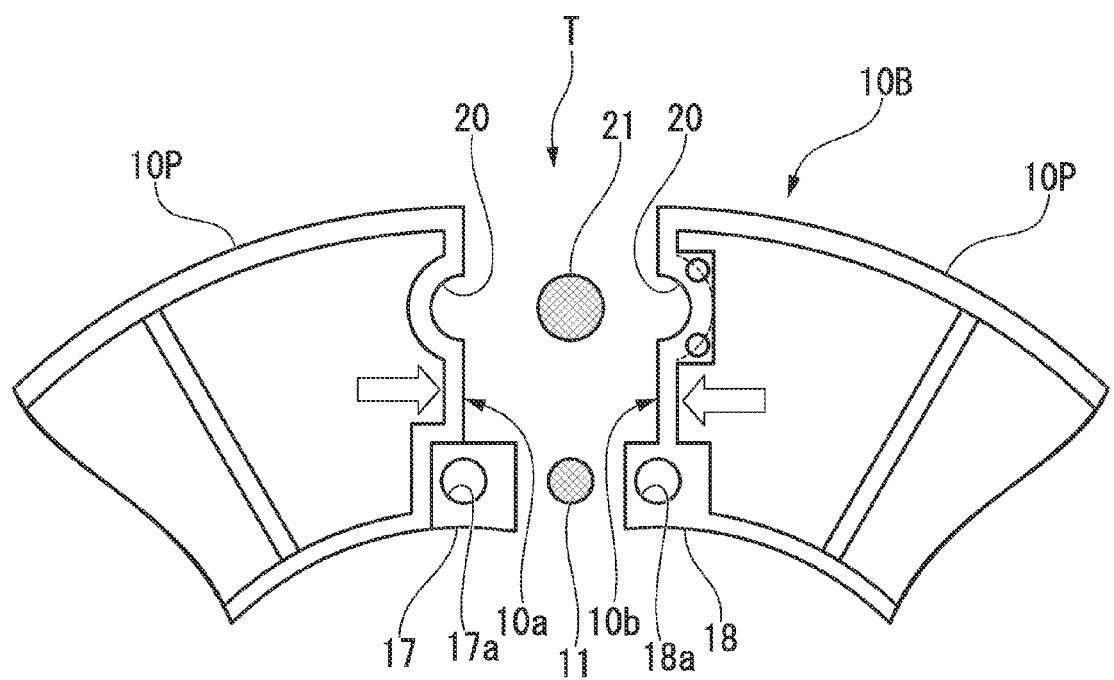
FIG. 9 is a side view for describing a first split surface and a second split surface before adjacent split pieces are joined in the second embodiment of the present invention.

As shown in FIGS. 7 to 9, a core 10B according to a second embodiment is configured so that, in the first and second split surfaces 10a and 10b of the split pieces 10P, a radial intermediate portion thereof is formed with a semi-circular groove (concave groove) 20 which extends in a width direction X. In a state in which the split pieces 10P adjacent to each other in a circumferential direction thereof are engaged on the first and second split surfaces 10a and 10b, a load receiving pin 21 is inserted into a communication part formed by both semicircular grooves 20.

Then, the load receiving pin 21 inserted through the communication part is configured so that opposite ends thereof are restrained from being displaced in an axial direction by pressure end plates (second stopper member) 22 fixed to one split piece 10P of a joint part T by a bolt.

Figure 10:
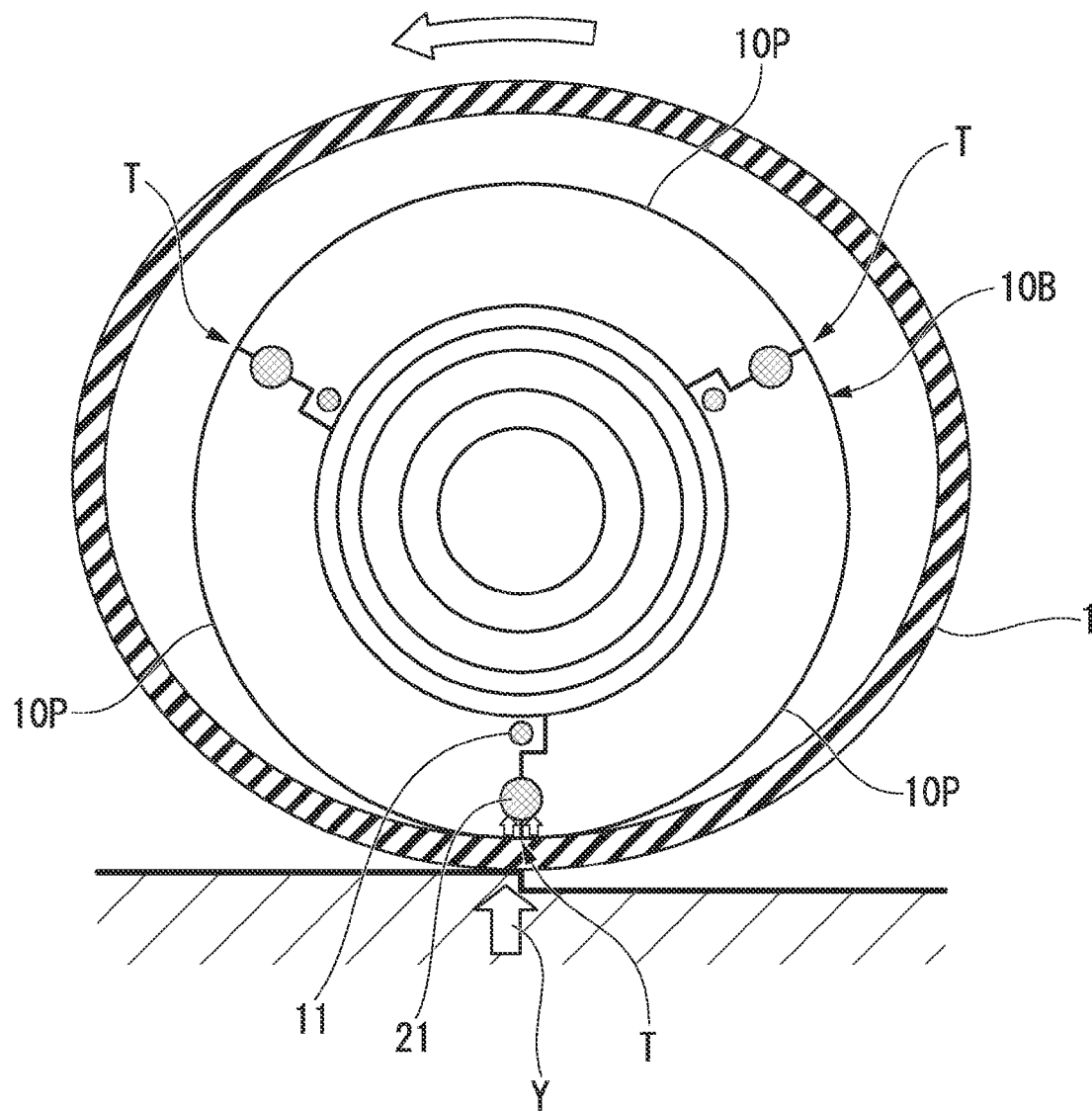
FIG. 10 is a side view for describing an operation of the core shown in FIG. 7.

In the second embodiment of the present invention, as shown in FIG. 10, when the tire 1 is punctured and a vehicle travels with a load supported by the core 10B, although a shear directional load is applied to the first and second split surfaces 10a and 10b of the split pieces 10P, this load is subjected to the load receiving pin 21 located at a radial outer circumferential side of the core. For this reason, the shear directional load is not directly applied to a coupling pin 11 that is installed at a radial inner circumferential side from the load receiving pin 21, and deformation of the coupling pin 11 can be more reliably suppressed. Since the deformation of the coupling pin 11 is suppressed in this way, disassembly work of the core 10B which occurs with the deformation of the coupling pin 11 can be efficiently carried out.

(Third Embodiment)

Figure 11:
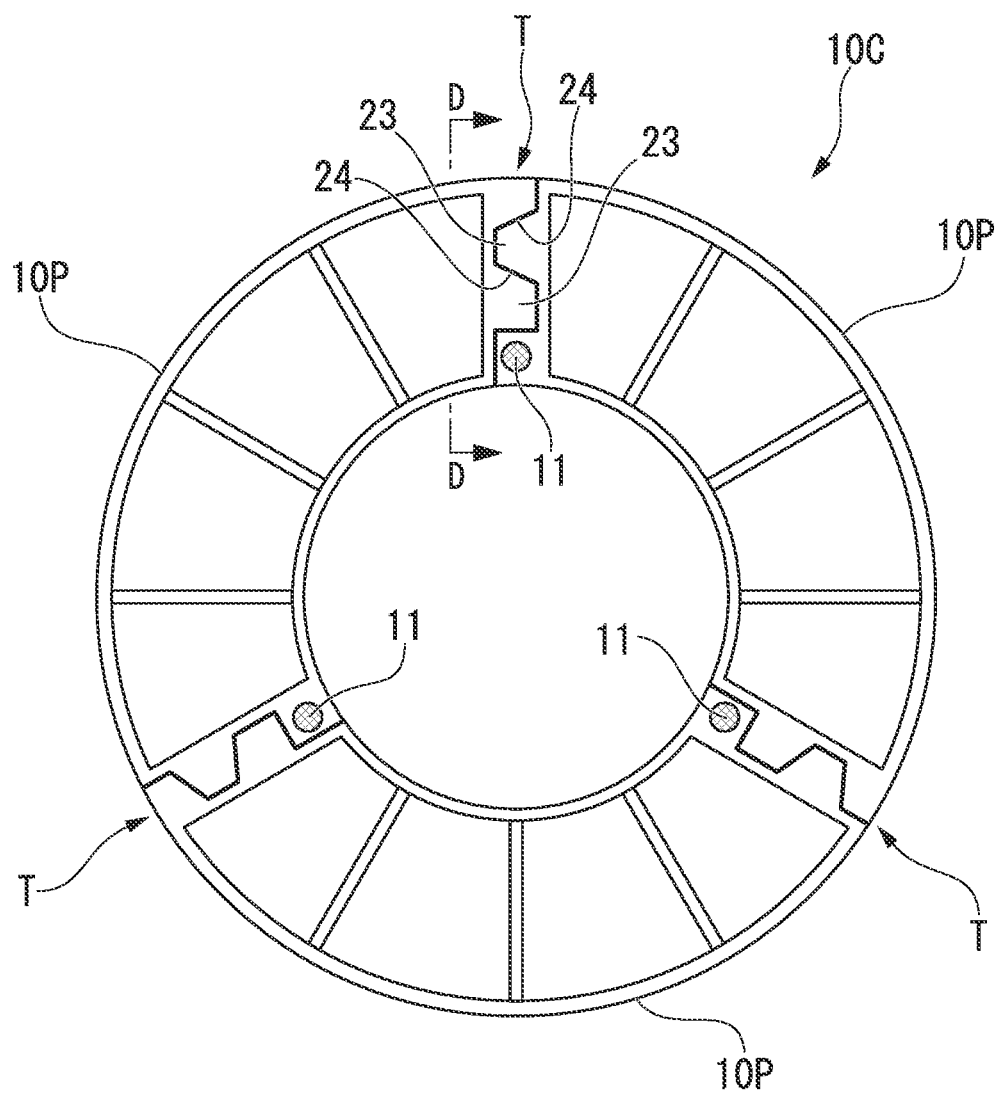
FIG. 11 is a side view showing a core according to a third embodiment of the present invention.
Figure 12:
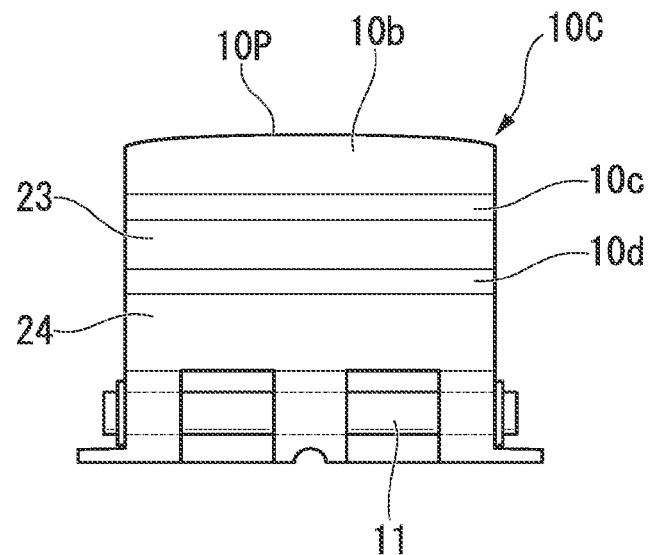
FIG. 12 is a cross-sectional view taken along line D-D shown in FIG. 11.
Figure 13:
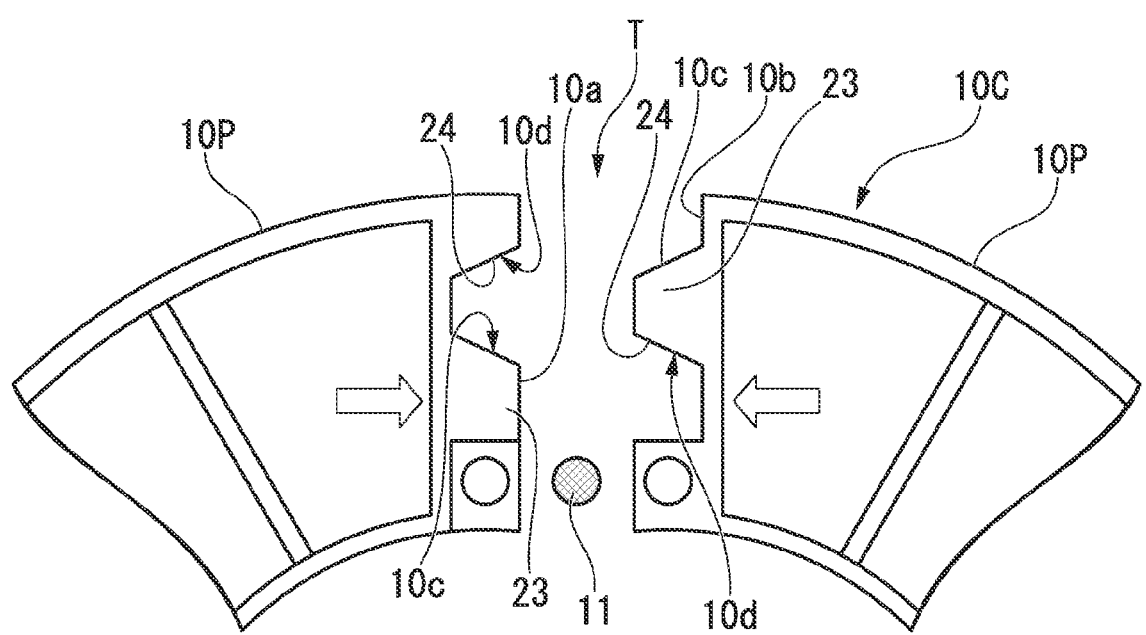
FIG. 13 is a side view for describing a first split surface and a second split surface before adjacent split pieces are joined in the third embodiment of the present invention.

Next, FIGS. 11 to 13 show a core 10C according to a third embodiment. The core 10C is configured so that, in the joint part T of the split pieces 10P, a trapezoidal engaging convex part 23 protruding from the first split surface 10a of one split piece 10P, and an engaging concave part 24 fitted with the engaging convex part 23 in the second split surface 10b of the other split piece 10P are provided at a radial outer circumferential side from the coupling piece 11.

Figure 14:
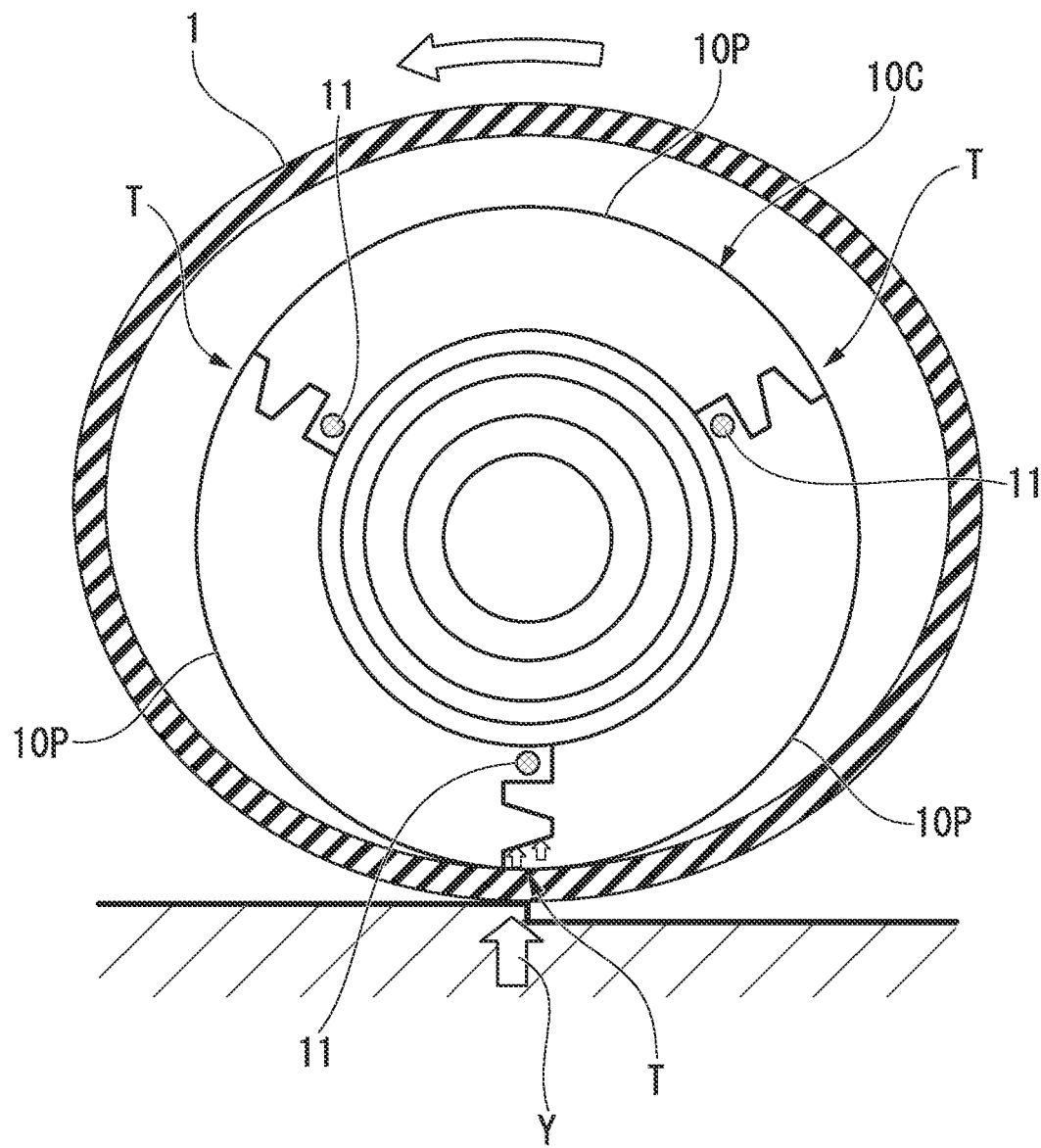
FIG. 14 is a side view for describing an operation of the core shown in FIG. 11.
Figure 15:
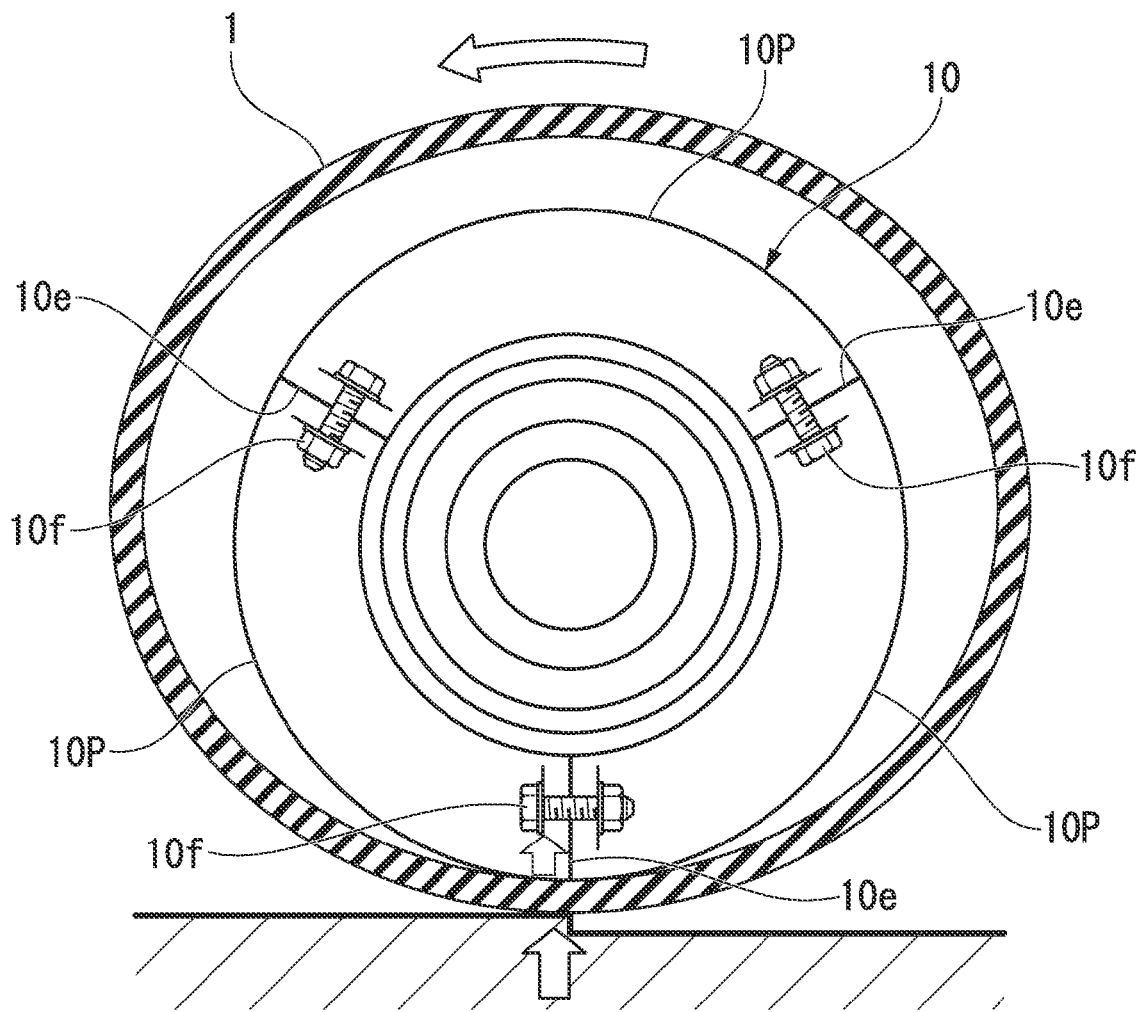
FIG. 15 is a side view showing a core in the related art.

In the third embodiment of the present invention, the engaging convex part 23 and the engaging concave part 24 are engaged, and thereby load receiving surfaces 10c and 10d having a predetermined angle with respect to the radial direction are formed. The load receiving surfaces 10c and 10d are subjected to a shear directional load applied between the split pieces 10P. For this reason, the shear directional load is not directly applied to the coupling pin 11, and the deformation of the coupling pin 11 can be more reliably suppressed (see FIG. 14). Since the deformation of the coupling pin 11 is suppressed in this way, the disassembly work of the core 10A which occurs with the deformation of the coupling pin 11 can be efficiently carried out.

Although the embodiments of the inner safety wheel, the tire with inner safety wheel, and the vehicle equipped with the tires with inner safety wheel in accordance with the present invention have been described, the present invention is not limited to the embodiments, and may be appropriately modified without departing from the spirit of the present invention.

For example, in the present embodiments, the C-shaped snap ring 19 is employed as the stopper member of the coupling pin 11. However, the stopper member is not limited to this, and thus another appropriate member such as an E-shaped snap ring, a pine-needle pin, or a split pin may stop the coupling pin.

Further, in the second embodiment, the semicircular grooves 20 of the first and second split surfaces 10a and 10b are combined, and the load receiving pin 21 of a circular cross section is inserted through the combined grooves. However, the present invention is not limited to this. For example, the groove may be a concave groove such as a quadrangular groove or a triangular groove. In this case, when a cross-sectional shape of the load receiving pin corresponds to a quadrangular groove, a quadrangular pin may be inserted horizontally. When the cross-sectional shape of the load receiving pin corresponds to a triangular groove, the quadrangular pin may be turned at an angle of 45 degrees and inserted horizontally.

Further, in the third embodiment, the engaging convex part 23 and the engaging concave part 24 are engaged, and thereby the load receiving surfaces 10c and 10d having a predetermined angle with respect to the radial direction are formed. However, the present invention is not limited to this. For example, the engaging convex part 23 may have a semicylindrical shape. In this case, the engaging concave part 24 may be a groove having a semicylindrical surface.

In addition, the components in the embodiment described above may be appropriately substituted with well-known components without departing from the spirit of the present invention. Further, the modifications described above may be appropriately combined.

INDUSTRIAL APPLICABILITY

According to the inner safety wheel, the tire with inner safety wheel, and the vehicle equipped with the tires with inner safety wheel of the present invention, in the joint part between the split cores, the deformation of the connecting shaft member against the shear directional load is suppressed. Thereby, the workability of assembling and disassembling the split cores can be increased, and the improvement of work efficiency can be promoted.

DESCRIPTION OF REFERENCE NUMERALS 1 tire (pneumatic tire)
2 wheel
3 axle hub
10A, 10B core
10a first split surface
10b second split surface
10c first load receiving surface (intersecting surface)
10d second load receiving surface (intersecting surface)
10P split piece
11 coupling pin (connecting shaft member)
16A, 16B joint plate
17 first convex insertion part
17a insertion hole
18 second convex insertion part
18a insertion hole
19 C-shaped snap ring (first stopper member)
20 semicircular groove (concave groove)
21 load receiving pin
22 pressure end plate (second stopper member)
23 engaging convex part
24 engaging concave part

The invention claimed is:

1. An inner safety wheel which is capable of being split into a plurality thereof in a circumferential direction, comprising:
a plurality of split pieces configuring a core of the inner safety wheel by abutting in the circumferential direction and being connected each other; and
a connecting shaft member which is disposed in a width direction of the split pieces and connects the plurality of split pieces abutting each other, wherein
the plurality of split pieces include a first split piece and a second split piece,
the first split piece has a first split surface which forms a split surface between the first split piece and the second split piece abutting the first split piece,
the first split surface has a first inclined surface which is parallel to the width direction of the first split piece and is inclined with respect to a radial direction of the core,
the second split piece has a second split surface which forms the split surface between the first split piece and the second split piece,
the second split surface has a second inclined surface which is parallel to the width direction of the second split piece and is inclined with respect to the radial direction of the core,
when the first split piece is assembled with the second split piece, the first inclined surface and the second inclined surface come in surface contact with each other, and the first and second inclined surfaces are located at a radial outer circumferential side of the core from the connecting shaft member,
the first split piece has a first convex insertion part which is formed on an end of the first split piece, wherein the first convex insertion part having a first insertion hole through which the connecting shaft member is inserted,
the second split piece has a second convex insertion part which is formed on an end of the second split piece, wherein the second convex insertion part having a second insertion hole through which the connecting shaft member is inserted,
the first split piece and the second split piece are capable of abutting each other such that the first insertion hole of the first convex insertion part is coaxially matched with the second insertion hole of the second convex part to insert the connection shaft member through the first and second insertion holes,
the first insertion part and the second convex insertion part are formed so as to be in contact with a radial inner circumferential side of the core,
the first split surface has a first plane surface which is parallel to the width direction of the first split piece and extends in the radial direction of the core, the first plane surface being located between the first incline surface and the first convex insertion part,
the second split surface has a second plane surface which is parallel to the width direction of the second split piece and extends in the radial direction of the core, the second plane surface being located between the second incline surface and the second convex insertion part, and
when the first split piece is assembled with the second split piece, the first plane surface and the second plane surface come in surface contact with each other.

2. The inner safety wheel according to claim 1, wherein the connecting shaft member is a pin member inserted through the split pieces adjacent to each other on the same axis.

3. The inner safety wheel according to claim 1, wherein:
the split surfaces of the split pieces have concave grooves extending in the width direction at the radial outer circumferential side from the connecting shaft member; and
in a state in which the split pieces adjacent to each other are engaged by the split surfaces, a load receiving pin is inserted into a communication part formed by both facing concave grooves on the split surfaces.

4. The inner safety wheel according to claim 3, wherein the load receiving pin includes second stopper members at opposite ends thereof which restrain axial movement of the load receiving pin.

5. The inner safety wheel according to claim 1, wherein the connecting shaft member includes first stopper members at opposite ends thereof which restrain axial movement of the connecting shaft member.

6. The inner safety wheel according to claim 1, wherein the split surfaces formed by the split pieces have an engaging convex part, which protrudes from one split piece, and an engaging concave part, which is fitted with the engaging convex part in the other split piece, provided at the radial outer circumferential side from the connecting shaft member.

7. A tire with inner safety wheel in which the inner safety wheel according to claim 1 is mounted.

8. A vehicle having a plurality of traveling wheels, each of which has the tire with inner safety wheel according to claim 7.

9. A tire with inner safety wheel in which the inner safety wheel according to claim 2 is mounted.

10. A tire with inner safety wheel in which the inner safety wheel according to claim 3 is mounted.

11. A tire with inner safety wheel in which the inner safety wheel according to claim 5 is mounted.

12. A tire with inner safety wheel in which the inner safety wheel according to claim 4 is mounted.

13. A tire with inner safety wheel in which the inner safety wheel according to claim 6 is mounted.

14. A vehicle having a plurality of traveling wheels, each of which has the tire with inner safety wheel according to claim 11.

15. A vehicle having a plurality of traveling wheels, each of which has the tire with inner safety wheel according to claim 9.

16. A vehicle having a plurality of traveling wheels, each of which has the tire with inner safety wheel according to claim 10.

17. A vehicle having a plurality of traveling wheels, each of which has the tire with inner safety wheel according to claim 12.

18. A vehicle having a plurality of traveling wheels, each of which has the tire with inner safety wheel according to claim 13.

19. An inner safety wheel which is capable of being split into a plurality thereof in a circumferential direction, comprising:
- a plurality of split pieces configuring a core of the inner safety wheel by abutting in the circumferential direction and being connected to each other; and
- a connecting shaft member which is disposed in a width direction of the split pieces and connects the plurality of split pieces abutting each other; wherein
- the plurality of split pieces include a first split piece and a second split piece,
- the first split piece has a first split surface which forms a split surface between the first split piece and the second split piece abutting the first split piece,
- the first split surface has a first inclined surface which is parallel to the width direction of the first split piece and is inclined with respect to a radial direction of the core,
- the second split piece has a second split surface which forms the split surface between the first split piece and the second split piece,
- the second split surface has a second inclined surface which is parallel to the width direction of the second split piece and is inclined with respect to the radial direction of the core,
- when the first split piece is assembled with the second split piece, the first inclined surface and the second inclined surface come in surface contact with each other, and the first and second inclined surfaces are located at a radial outer circumferential side of the core from the connecting shaft member,
- the first split piece has a first convex insertion part which is formed on an end of the first split piece, wherein the first convex insertion part has a first insertion hole through which the connecting shaft member is inserted,
- the second split piece has a second convex insertion part formed on an end of the second split piece, the second convex insertion part has a second insertion hole through which the connecting shaft member is inserted,
- the first and second split pieces are capable of abutting each other such that the first insertion hole of the first convex insertion part is coaxially matched with the second insertion hole of the second convex part to insert the connecting shaft member through the first and second insertion holes,
- the first and second convex insertion parts are formed so as to be in contact with a radial inner circumferential side of the core, and
- in an assembled state, the first and second inclined surfaces have the same width as an outermost peripheral portion of the assembled core.

20. An inner safety wheel which is capable of being split into a plurality thereof in a circumferential direction, comprising:
- a plurality of split pieces configuring a core by abutting in the circumferential direction and being connected to each other; and
- a connecting shaft member which is disposed in a width direction of the split pieces and connects the plurality of split pieces abutting each other, wherein
- the plurality of split pieces include a first split piece and a second split piece,
- the first split piece has a first split surface which forms a split surface between the first split piece and the second split piece abutting the first split piece,
- the first split surface has a first inclined surface which is parallel to the width direction of the first split piece and is inclined with respect to a radial direction of the core,
- the second split piece has a second split surface which forms the split surface between the first split piece and the second split piece,
- the second split surface has a second inclined surface which is parallel to the width direction of the second split piece and is inclined with respect to the radial direction of the core,
- when the first split piece is assembled with the second split piece, the first inclined surface and the second inclined surface come in surface contact with each other, and the first and second inclined surfaces are located at a radial outer circumferential side of the core from the connecting shaft member,
- the first split piece has first convex insertion parts formed on an end of the first split piece, each of the first convex insertion parts has a first insertion hole through which the connecting shaft member is inserted, the first convex insertion parts being separated from each other in the width direction, the second split piece has second convex insertion parts formed on an end of the second split piece, each of the second convex insertion parts has a second insertion hole through which the connecting shaft member is inserted, the second convex insertion parts being separated from each other in the width direction, and the first and second split pieces are capable of abutting each other such that the first insertion hole of the first convex insertion part is coaxially matched with the second insertion hole of the second convex part to insert the connecting shaft member through the first and second insertion holes.

* * * * *